US008515672B1

(12) United States Patent
Snyder et al.

(10) Patent No.: US 8,515,672 B1
(45) Date of Patent: Aug. 20, 2013

(54) SYSTEMS AND METHODS TO INCORPORATE MASTER NAVIGATION SYSTEM RESETS DURING TRANSFER ALIGNMENT

(75) Inventors: Scott Snyder, Mahtomedi, MN (US); Benjamin Mohr, St. Louis Park, MN (US)

(73) Assignee: Honeywell International Inc., Morristown, NJ (US)

( * ) Notice: Subject to any disclaimer, the term of this patent is extended or adjusted under 35 U.S.C. 154(b) by 41 days.

(21) Appl. No.: 13/409,707

(22) Filed: Mar. 1, 2012

(51) Int. Cl.
*G01C 21/00* (2006.01)

(52) U.S. Cl.
USPC .......................................... 701/510

(58) Field of Classification Search
None
See application file for complete search history.

(56) References Cited

U.S. PATENT DOCUMENTS

| 5,672,872 | A | 9/1997 | Wu |
| 2009/0265104 | A1* | 10/2009 | Shroff ............................ 701/216 |
| 2009/0326851 | A1* | 12/2009 | Tanenhaus ....................... 702/96 |
| 2012/0182180 | A1* | 7/2012 | Wolf et al. ................ 342/357.29 |

OTHER PUBLICATIONS

"Kalman Filter Integration of Modern Guidance and Navigation Systems", Nov. 16, 1989, pp. 1-16.
Huddle, "Transfer Alignment for Harmonization of Targeting Sensors to Minimize Target Location Error", Jun. 2006, pp. 1-10, Publisher: Northrop Grumman.
Karsenti, "A Study of IMU Alignment Transfer", Feb. 1989, pp. 1-181.
Riedel et al, "Guidance and Navigation in the Global Engagement Department", "Johns Hopkins APL Technical Digest", Jan. 2010, pp. 118-132, vol. 29, No. 2.
Shortelle et al., "F-16 Flight Test Results of a MEMS IMU Calibration and Alignment Algorithm", Nov. 2000, pp. 1-12, Publisher: Systems Dynamics International Inc.
Shortelle et al., "Additional Flight Tests of a MEMS IMU Calibration and Alignment Algorithm", Dec. 2001, pp. 1-15, Publisher: Systems Dynamics International, Inc.
Shortelle et al., "F-16 Flight Tests of a Rapid Transfer Alignment Procedure", Apr. 1998, pp. 1-8, Publisher: System Dynamics International, Inc.

* cited by examiner

*Primary Examiner* — Thomas Tarcza
*Assistant Examiner* — Adam Alharbi
(74) *Attorney, Agent, or Firm* — Fogg & Powers LLC

(57) ABSTRACT

Systems and methods to incorporate master navigation system resets during transfer alignment are provided. In one embodiment, a system comprises: a set of local inertial sensors; a local navigation processor coupled to local inertial sensors, the local navigation processor receiving inertial navigation data from local inertial sensors and converting the data into a navigation solution; a local Kalman filter (LKF) coupled to the local navigation processor and a master Kalman filter (MKF), the LKF receiving the navigation solution. The LKF receives from the MKF a Precision Transfer Alignment Message (PTAM) that includes at least one navigation aid measurement. The LKF inputs the navigation aid measurement into a measurement formation algorithm and calculates a measurement residual. The LKF receives from the MKF a Reset Transfer Alignment Message (RTAM) that includes a bias correction. The LKF inputs the bias correction into a state propagation algorithm to add to a navigation state.

20 Claims, 3 Drawing Sheets

US 8,515,672 B1

SYSTEMS AND METHODS TO INCORPORATE MASTER NAVIGATION SYSTEM RESETS DURING TRANSFER ALIGNMENT

BACKGROUND

Transfer alignment is the process of transmitting navigation information from an onboard navigation system of an aircraft to the onboard navigation system of a payload that is deployed from the aircraft while in flight. The navigation information typically takes the form of periodic messages that convey position, velocity and attitude as measured by the aircraft navigation system. The navigation system on the payload receives these periodic messages from the aircraft as measurement updates used to derive error statistics for calibrating its own navigation solution. A problem occurs from the fact that the onboard navigation system of the aircraft periodically needs to adjust its own navigation solution to correct for accumulated drift error. This adjustment will appear as a step change in the measurement updates received by the navigation system on the payload. If the step change is too large, the navigation system on the payload may reject the measurement update. Even if the navigation system on the payload accepts the step change measurement update, it faces the conundrum of how to account for the step change and allocate what it must interpret as a measurement error generated by one or more of its own sensors.

For the reasons stated above and for other reasons stated below which will become apparent to those skilled in the art upon reading and understanding the specification, there is a need in the art for systems and methods to incorporate master navigation system resets during transfer alignment.

SUMMARY

The Embodiments of the present invention provide methods and systems that address the master navigation system resets during transfer alignment and will be understood by reading and studying the following specification.

In one embodiment, a navigation system for performing a transfer alignment comprises: a set of local inertial sensors; a local strap-down navigation processor coupled to the set of local inertial sensors, the local strap-down navigation processor receiving inertial navigation data from the set of local inertial sensors and converting the inertial navigation data into a navigation solution; a local Kalman filter coupled to the local strap-down navigation processor, the local Kalman filter receiving the navigation solution produced by the local strap-down navigation processor, the local Kalman filter further coupled to a master Kalman filter; wherein the local Kalman filter receives a first message from the master Kalman filter comprising a Precision Transfer Alignment Message (PTAM) that includes at least one navigation aid measurement; wherein the local Kalman filter inputs the navigation aid measurement into a measurement formation algorithm and calculates a measurement residual based on the navigation aid measurement; wherein the local Kalman filter receives a second message from the master Kalman filter comprising a Reset Transfer Alignment Message (RTAM) that includes a bias correction applied by the master Kalman filter as a navigation reset; wherein the local Kalman filter inputs the bias correction into a state propagation algorithm where the bias correction provided by the bias correction is added to a navigation state of the local Kalman filter and propagated.

DRAWINGS

Embodiments of the present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout figures and text.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the present invention. The following detailed description is, therefore, not to be taken in a limiting sense.

Embodiments of the present description address the needs to address bias corrections in transfer alignment configurations through a modified Kalman filter algorithm implemented in the local navigation system of the payload. In addition to having utilizing navigation information from a master Kalman filter as a navigation aid, with embodiments of the present invention, the local Kalman filter also receives a bias correction via a specific messages generated by the master Kalman filter when the master Kalman filter performs a navigation reset. The local Kalman filter utilizes the bias correction to adjust the values of its own navigation states so that when the local Kalman filter calculates a measurement residual, deviations in the navigation aid measurements due to the reset at the master Kalman filter are offset by the adjustments made to the local navigation states. As a result, no additional residual at the local Kalman filter is produced as a result of the bias correction reset performed at the master Kalman filter.

Figure 1:
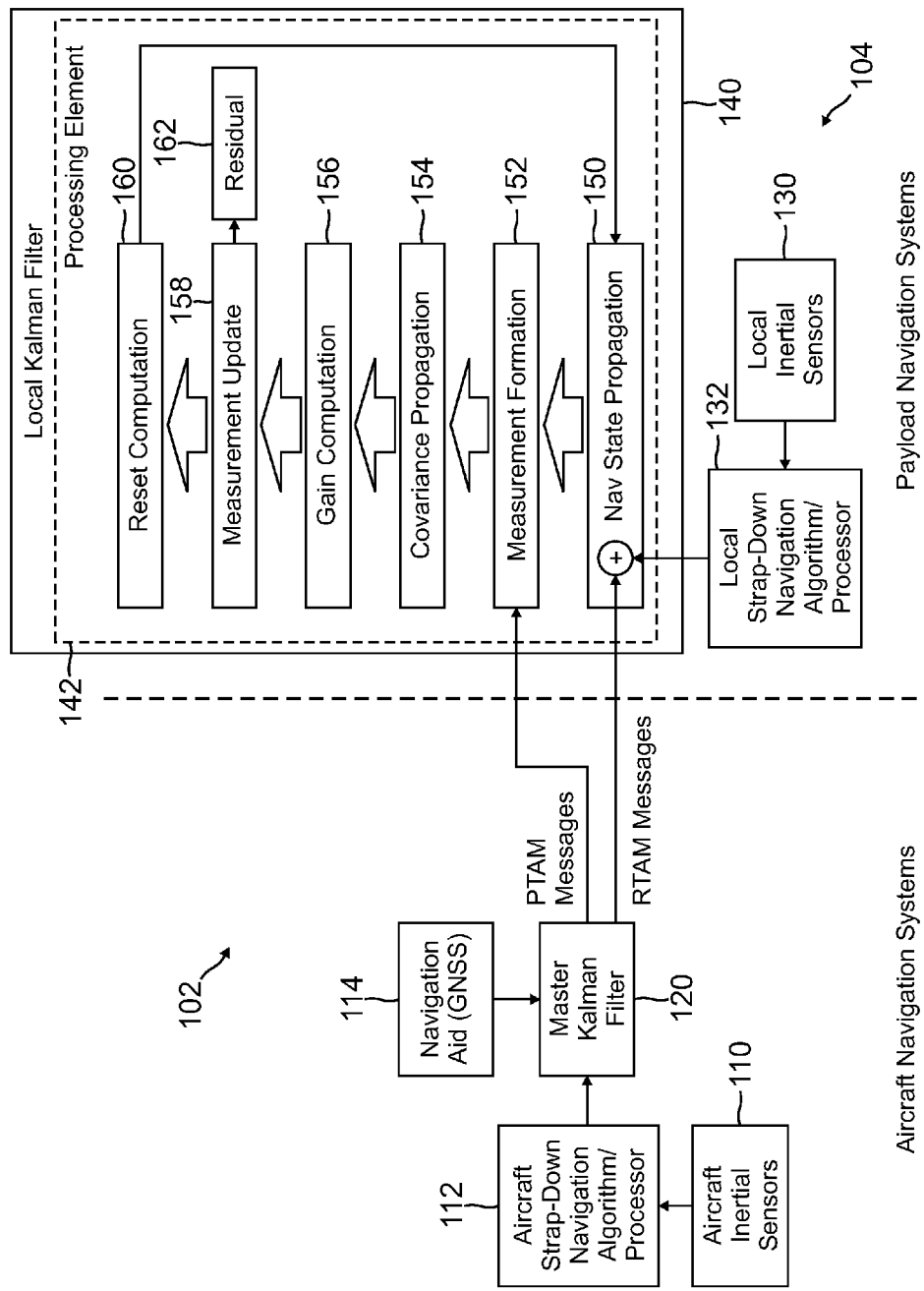
FIG. 1 is a diagram illustrating a navigation system of one embodiment of the present invention.

FIG. 1 is a block diagram of a transfer alignment system 100 of one embodiment of the present invention. System 100 comprises a host aircraft navigation system 102 located onboard an aircraft (such as an airplane or helicopter, for example) and a payload navigation system 104 located onboard a payload mounted to the aircraft which is subsequently launched from the aircraft.

Aircraft navigation system 102 comprises aircraft inertial sensors 110, an Aircraft Strap-Down Navigation Algorithm 112, a navigation aid 114 and a master Kalman filter. The aircraft inertial sensors 110 provide 3-axis gyroscope and 3-axis accelerometer measurements of the aircraft frame to Strap-Down Navigation Algorithm 112. From these measurements, Strap-Down Navigation Algorithm 112 produces a navigation solution for the aircraft, including the aircrafts position, velocity and attitude in 3 dimensions. Navigation aid 114 provides a secondary source for one or more parameters of a navigation solution for the aircrafts position, velocity and attitude. In one embodiment, Navigation aid 114 comprises a navigation receiver for a Global Navigation Satellite System such as, for example, a Global Positioning System (GPS) receiver.

The Strap-Down Navigation Algorithm 112 is a basic navigation algorithm that takes the output from accelerometers and gyros in the aircraft inertial sensors 110 and integrates them up to produce position, velocity and attitude data. This data is referred to as a navigation solution. The values provided in the navigation solution will drift over time. For example, a small error in acceleration or rotation will compound over time if no correction is performed. Therefore, Aircraft navigation system 102 needs to periodically correct for these drift error using a measurement from navigation aid 114. Master Kalman filter 120 receives the navigation data from Strap-Down Navigation Algorithm 112 and navigation aid 114 and using this information estimates the error in the strapdown navigation solution given a particular measurement from the navigation aid 114. Once an error is estimated, Master Kalman filter 120 computes and applies a reset (which comprises a step change correction to the strapdown navigation solution) to adjust the Strap-Down Navigation Algorithm 112 output to accommodate for the drift. Resets are generally performed on a periodic basis, but in some embodiments may be held until an accumulated error to reaches a threshold. In one embodiment, update to the navigation solution from the Strap-Down Navigation Algorithm 112 are provided at relatively high rate as compared to updates from Master Kalman filter 120. For example, in one embodiment, Strap-Down Navigation Algorithm 112 provides updates to its navigation solution output at a rate of 100 Hz (100 times/sec) while the Master Kalman filter 120 generates reset at a rate of 1 Hz (once/sec). In one embodiment, each time the Master Kalman filter 120 estimates an error, in applies a reset to the Strap-Down Navigation Algorithm 112.

Payload navigation system 104 operates in a very similar way to aircraft navigation system 102, which the notable exception that Master Kalman filter 120 functions as the source of Navigation aid data for Payload navigation system 104. As shown in FIG. 1, Payload navigation system 104 comprises inertial sensors 130, a Local Strap-Down Navigation Algorithm 132, and a Kalman filter (referred to herein as the local Kalman filter 140). The local inertial sensors 130 provide 3-axis gyroscope and 3-axis accelerometer measurements of the payload body to Strap-Down Navigation Algorithm 132. From these measurements, Strap-Down Navigation Algorithm 132 produces a navigation solution for the payload, including the payload's position, velocity and attitude in 3 dimensions. Local Kalman filter 140 uses measurements from the master Kalman filter 120 as the navigation aid for calculating error in the navigation solution provided by Strap-Down Navigation Algorithm 132. That is, it uses messages from master Kalman filter 120 form a measurement from which it will estimate its own error in its own strap-down navigation system and performing a reset based on that estimate of error.

In one embodiment, local Kalman filter 140 comprises an extended Kalman filter algorithm executed by a processing element 142. In one embodiment, in order to implement Kalman filter 140, processing element 142 executes a series of algorithms components, shown at 150-160 in FIG. 1 and using the corresponding respective reference numbers in the following table:

| Ref. No. | Algorithm Component | Equation Implemented by Algorithm Component |
| --- | --- | --- |
| 150 | State propagation (including addition of RTAM) | $\Delta x_k^- = \phi_k \Delta x_{k-1}^+ - r_k + T_k$ |
| 152 | Measurement Formation | $y_k = PTAM_n - h(x_k^+)$ |
| 154 | Covariance Propagation | $P_k^- = \phi_k P_{k-1}^+ \phi_k^T + Q_k$ |
| 156 | Gain computation | $K_k = P_k^- H_k^T (H_k P_k^- H_k^T + R)^{-1}$ |
| 158 | Measurement update | $\Delta x_k^+ = \Delta x_k^- + K_k(y_k - H_k \Delta x_k^-)$ |
| 160 | Compute Resets to Plant and states | $r_k = f(\Delta x_k^+)$ |

Where the variable notation in the equations follow standard Kalman filter nomenclature except as indicated herein. As would be appreciated by one of ordinary skill in the art upon reading this disclosure, the values held the states of the navigation state vector, $x_k$, can be either in absolute navigation terms (e.g., a position or velocity value), or alternate values such as values based on a linear function of a navigation measurement value.

Local Kalman filter 140 receives two different types of messages from master Kalman filter 120, which communicate two different measurements. The first message type is a Precision Transfer Alignment Message (PTAM). A PTAM conveys conventional position, velocity and attitude navigation solution measurements (or a subset thereof) that the local Kalman filter 140 uses as navigation aid measurements. In one embodiment, a PTAM provides absolute measurements. However, in other embodiments, the PTAM may provide the navigation solution measurements in other ways. In Local Kalman filter 140, the values provided by PTAM are entered into the Measurement Formation algorithm component 152 as shown in the table above and in FIG. 1.

The second type of message from master Kalman filter 120 is generated each time the master Kalman filter 120 generates a reset to its own Strap-Down Navigation Algorithm 112. For this reason, the second type message is referred to as a Reset Transfer Alignment Message (RTAM). In essence, one purpose of the RTAM is to provide notice to the local Kalman filter 140 that the measurements provided by the next PTAM message may include a significant step change in one or more measurements from those provided in the previously received PTAM. More than that, however, with embodiments of the present invention, the local Kalman filter 140 is constructed to utilize a received RTAM within its Kalman algorithms so that its calculated residual will not increase due to a unexpected measurement error caused by a reset in the master Kalman filter 120. In local Kalman filter 140, the values provided by RTAM are entered into the State propagation algorithm component 150 as shown and FIG. 1 and as represented by the variable Tk as shown in the table above. For iterations of local Kalman filter 140 where no RTAM has been received, the value of Tk used to calculate State propagation algorithm component 150 is simply zero for that iteration.

In local Kalman filter 140, the Measurement Formation algorithm component 152 determines $y_k$, which represents the difference between the most recent measurement (e.g. $PTAM_n$) and its prediction (represented by $h(x_k^+)$) of what the next measurement (e.g. $PTAM^{n+1}$) will be.

Measurement Formation algorithm component 152 does not directly include the value of incoming RTAM messages, Tk, in its computation, but does include the values from PTAM messages. When an RTAM message is generated by master Kalman Filter 120, the Measurement Formation algorithm component 152's prediction $h(x_k^+)$ of the next PTAM measurement will be off by Tk because of the step change of Tk that will appear in the next PTAM message. For example, assume that the master Kalman Filter 120 outputs a PTAM message with the position value $p_1$, and subsequently outputs an RTAM message with a position step change correction of $\Delta p$. The PTAM message next received from the master Kalman Filter 120 will have a position value $p_2$ that reflects both any actual change in position since $p_1$ plus the position step change correction of $\Delta p$. Without properly addressing the effects of the master Kalman Filter 120 reset that caused the RTAM message, the Measurement Formation algorithm component 152's prediction $h(x_k^+)$ of $p_2$ will reflect the change in position, but will be off by the $\Delta p$ position step change correction $\Delta p$.

This error in the prediction would manifest itself in the residual calculation performed by local Kalman filter 140 as an unexpected occurrence of error. That is, the value of the residual, v, (shown in FIG. 1 at 162) calculated as part of the Measurement Update algorithm component 158 and represented by the expression:

$$v = y_k - H_k \Delta x_k^-$$

will be off by a factor that is a function of the step change value Tk, which can be illustrated by the expression:

$$v = y_k + H_k T_k - H_k \Delta x_k^-$$

To offset the effect of the master Kalman Filter 120 reset and subsequent step change in the next PTAM message, when an RTAM message is received, the value of Tk, is added with the navigation solution, $\phi_k \Delta x_{k-1}^+$, calculated from payload's the strap-down sensors and propagated forward in time as part of the navigation state vector $\Delta x_k^-$ by the State propagation algorithm component 150. When the Measurement update algorithm component 158 is subsequently executed, the residual calculation will end up with two instances of $H_k T_k$ that cancel each other out as shown be the expression:

$$v = y_k + H_k T_k - H_k \Delta x_k^- - H_k T_k$$

As shown in this expression, any step change introduced through the value of PTAM caused by a reset of the master Kalman filter 120 will cause an error in the prediction of that PTAM resulting in a change to the residual, v, by $+H_k T_k$. This error will be canceled out by the effect of adding the RTAM value Tk to the navigation state vector, resulting in a change to the residual, v, by $-H_k T_k$. These values of $+H_k T_k$ and $-H_k T_k$ sum to have a net zero effect on the value of the residual. In other words, the residual will not indicate the presence of any non-anticipated error caused by the master Kalman filter 120 reset. Further, in this embodiment, because receiving an RTAM message has no net effect on the calculation of the residual, the effects of receiving such an RTAM will not trigger local Kalman filter 140 to reject subsequent incoming PTAM messages.

Figure 2:
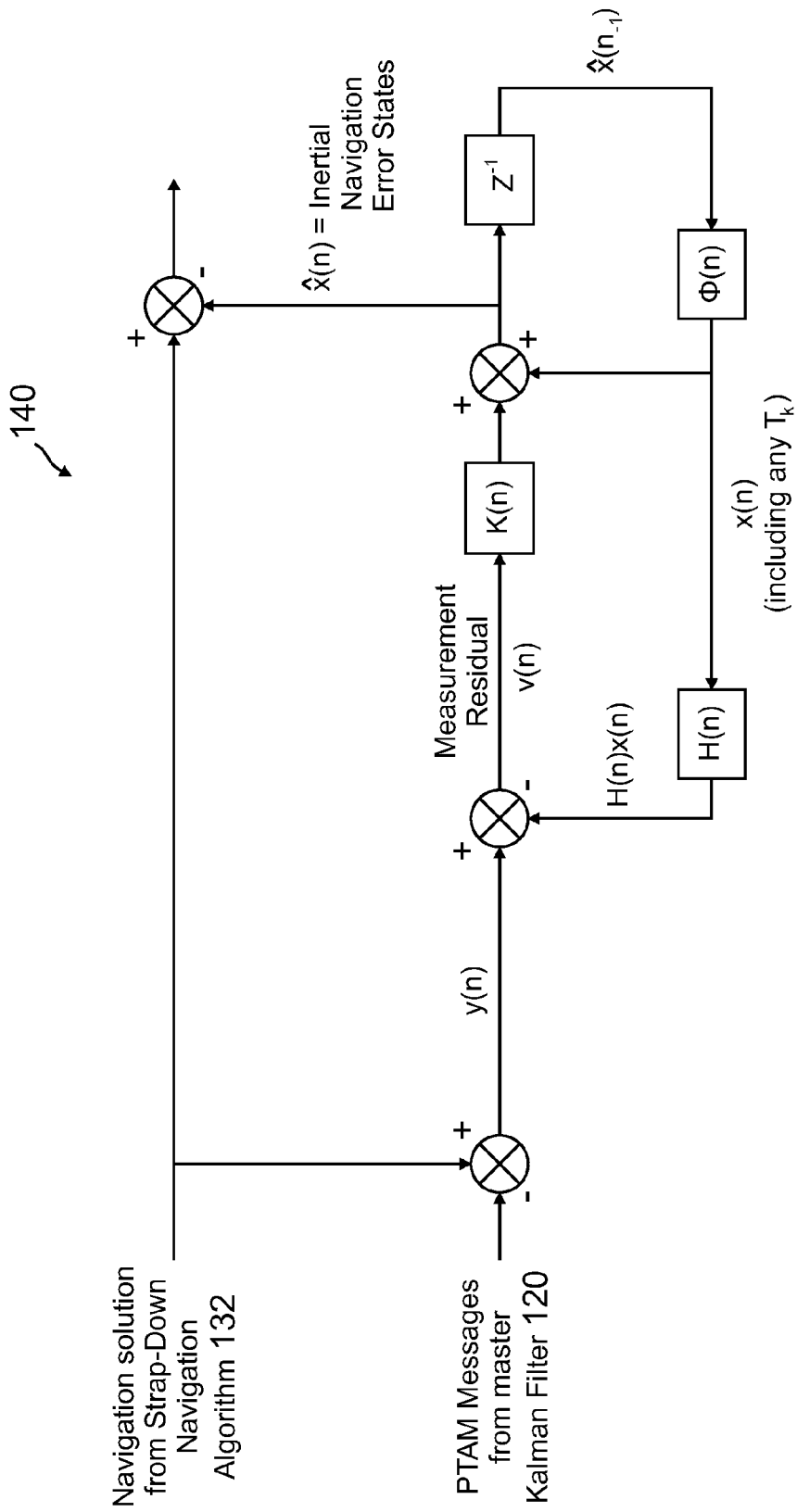
FIG. 2 is a diagram illustrating a local Kalman filter of one embodiment of the present invention.

FIG. 2 is a diagram providing an alternate illustration of local Kalman filter 140. The filter measurement y(n) is the difference between the data from the payload's strap-down navigation algorithm 132 the measurement values from PTAM messages provided by the master Kalman filter 120. The output of the H(h) block is H(n)×(n) which represents the local Kalman filter 140's prediction of what the next value of y(n) will be. The difference between the two is the measurement residual v(n), which as mentioned above, represents an amount of error in the strapdown navigation data not anticipated by the local Kalman filter 140.

As explained above, when the master Kalman filter 120 generates a bias correction reset and RTAM message, the effect of that reset also appear in subsequent PTAM messages. Thus, the value of y(n) will increase by a corresponding value of $H_k T_k$. To accommodate this increase in PTAM message values without affecting the measurement residual v(n), the value Tk of the corresponding RTAM message is added to the navigation state x(n) and then propagated. This increase the value of H(n)×(n) by $H_k T_k$. When the difference between y(n) and H(n)×(n) is determined, the two instances of $H_k T_k$ are canceled out. Kalman Gain matrix K(n) then produces a weighted vector that determines how much to compensate due to the errors represented by the measurement residual v(n). The output of K(n) is added to x(n) (which includes an uncanceled $H_k T_k$ to implement the necessary reset) to produce navigation error states $\hat{x}(n)$. The navigation solution output of the local Kalman filter 140 is thus a function of the strapdown navigation data as adjusted by the navigation error states $\hat{x}(n)$. As indicated by the diagram, the navigation error states $x^{\hat{x}(n)}$ provide the necessary drift compensation determined by the master Kalman filter 120, without causing any corresponding net increase in the measurement residual v(n).

Figure 3:
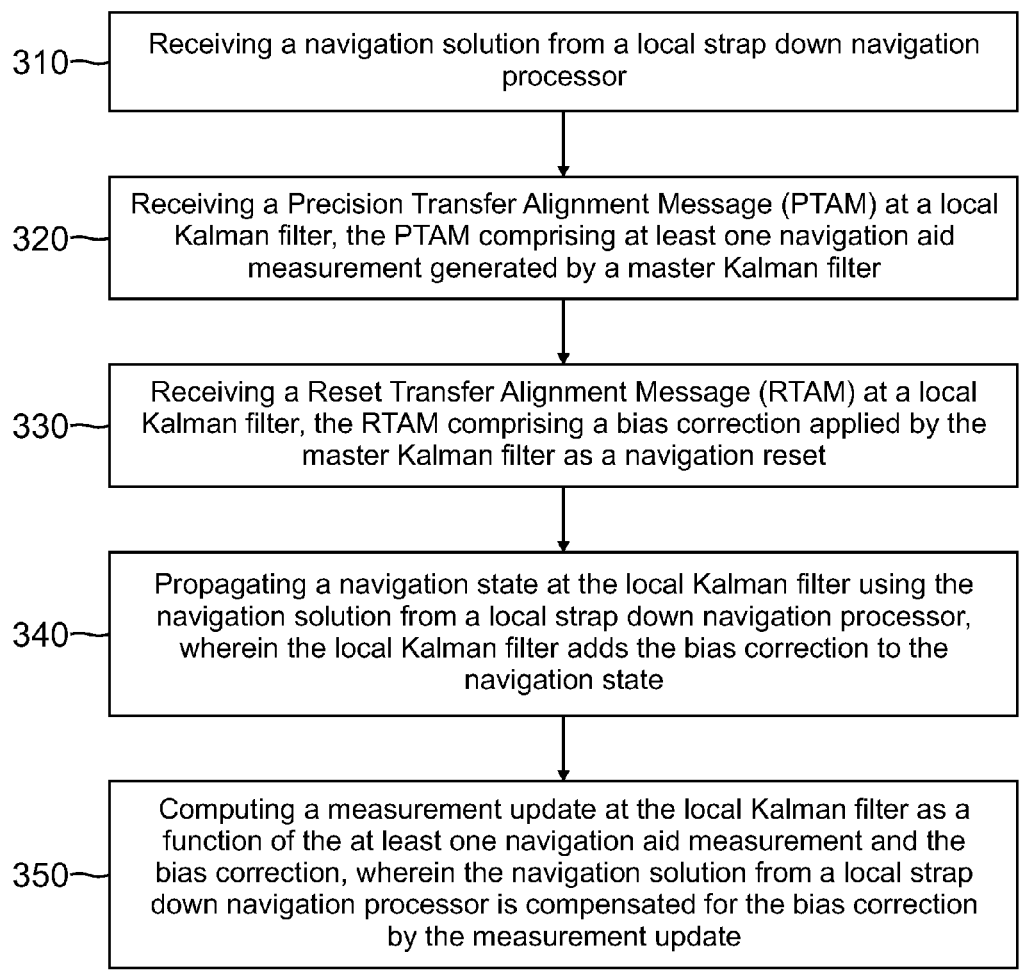
FIG. 3 is a flow chart illustrating a method of one embodiment of the present invention.

FIG. 3 is a flow chart illustrating a method for performing a transfer alignment from a host navigation system to a payload navigation system. In one embodiment, the method is implemented using the host aircraft navigation system 102 located onboard an aircraft and payload navigation system 104 located onboard a payload mounted to the aircraft as described above with respect to FIG. 1. The method begins at 310 with receiving a navigation solution from a local strap down navigation processor. In one embodiment, the local strap down navigation processor is coupled to a set of local inertial sensors aboard the payload that comprises at least a triad of orthogonal accelerometers and a triad of orthogonal gyroscopes.

The method proceeds to 320 with receiving a Precision Transfer Alignment Message (PTAM) at a local Kalman filter, the PTAM comprising at least one navigation aid measurement generated by a master Kalman filter. As explained above, the bias correction provided by the RTAM may include a position correction, a velocity correction, an attitude correction, or a combination thereof. In one embodiment, the bias correction comprises a nine-dimensional vector comprising a 3-dimensional position bias correction, a 3-dimensional velocity correction, and a 3-dimensional attitude correction.

The method proceeds to 330 with receiving a Reset Transfer Alignment Message (RTAM) at a local Kalman filter, the RTAM comprising a bias correction applied by the master Kalman filter as a navigation reset. In one embodiment, the master Kalman filter receives navigation data from the aircraft's Strap-Down Navigation Algorithm and navigation aid and using this information estimates the error in its strapdown navigation solution given a particular measurement from the navigation aid. When a drift error is estimated, the master Kalman filter computes and applies a reset to adjust the aircraft's Strap-Down Navigation Algorithm output to accommodate for the drift. Resets are generally performed on a periodic basis, but in some embodiments may be held until an accumulated error to reaches a threshold.

In one embodiment, the PTAM communicates the at least one navigation aid measurement as absolute navigation solution values while the RTAM communications the bias correction as a change in navigation solution values.

The method proceeds to 340 with propagating a navigation state at the local Kalman filter using the navigation solution from a local strap down navigation processor, wherein the local Kalman filter adds the bias correction to the navigation state. The method proceeds to 350 with computing a measurement update at the local Kalman filter as a function of the at least one navigation aid measurement and the bias correction, wherein the navigation solution from a local strap down navigation processor is compensated for the bias correction by the measurement update.

In one embodiment, the local Kalman filter implements the algorithm components 150-160 illustrated in the table above and in FIG. 1. As such, in one embodiment, propagating the navigation state at the local Kalman filter is calculated using an equation equivalent to: $\Delta x_k^- = \phi_k \Delta x_{k-1}^+ - r_k \div T_k$, where $T_k$ is the bias correction provided by the RTAM. Computing a measurement update at the local Kalman filter may be calculated using an equation equivalent to: $\Delta x_k^+ = \Delta x_k^- \div K_k(y_k - H_k \Delta x_k^-)$ where $y_k = PTAM_n - h(x_k^+)$. As explained above, the local Kalman filter utilizes the bias correction to adjust the values of its own navigation states so that when the local Kalman filter calculates a measurement residual, deviations in the navigation aid measurements due to the reset at the master Kalman filter are offset by the adjustments made to the local navigation states. As a result, no additional residual at the local Kalman filter is produced as a result of the bias correction reset performed at the master Kalman filter.

Example Embodiments

Example 1 includes a navigation system for performing a transfer alignment, the navigation system comprising: a set of local inertial sensors; a local strap-down navigation processor coupled to the set of local inertial sensors, the local strap-down navigation processor receiving inertial navigation data from the set of local inertial sensors and converting the inertial navigation data into a navigation solution; a local Kalman filter coupled to the local strap-down navigation processor, the local Kalman filter receiving the navigation solution produced by the local strap-down navigation processor, the local Kalman filter further coupled to a master Kalman filter; wherein the local Kalman filter receives a first message from the master Kalman filter comprising a Precision Transfer Alignment Message (PTAM) that includes at least one navigation aid measurement; wherein the local Kalman filter inputs the navigation aid measurement into a measurement formation algorithm and calculates a measurement residual based on the navigation aid measurement; wherein the local Kalman filter receives a second message from the master Kalman filter comprising a Reset Transfer Alignment Message (RTAM) that includes a bias correction applied by the master Kalman filter as a navigation reset; wherein the local Kalman filter inputs the bias correction into a state propagation algorithm where the bias correction provided by the bias correction is added to a navigation state of the local Kalman filter and propagated.

Example 2 includes the navigation system of Example 1, wherein the bias correction provided by the RTAM includes one of a position correction, a velocity correction, an attitude correction, or a combination thereof.

Example 3 includes navigation system of Example 1 or 2, wherein the bias correction comprises a nine-dimensional vector comprising a 3-dimensional position bias correction, a 3-dimensional velocity correction, and a 3-dimensional attitude correction.

Example 4 includes the navigation system of Example 1, 2 or 3, wherein the PTAM communicates the at least one navigation aid measurement as absolute navigation solution values; and wherein the RTAM communications the bias correction as a change in navigation solution values.

Example 5 includes the navigation system of any of Examples 1-4, wherein the set of local inertial sensors comprises at least a triad of orthogonal accelerometers and a triad of orthogonal gyroscopes.

Example 6 includes the navigation system of any of Examples 1-5, wherein the local Kalman filter is implemented using an Extended Kalman Filter algorithm.

Example 7 includes the navigation system of any of Examples 1-6, further comprising a processing element; wherein the local Kalman filter is implemented as an algorithm executed by the processing element.

Example 8 includes the navigation system of any of Examples 1-7, wherein the local strap-down navigation processor and the local Kalman filter are both implemented using the same processor.

Example 9 includes the navigation system of any of Examples 1-8, wherein the measurement formation algorithm is calculated using an equation equivalent to: $y_k = PTAM_n - h(x_k^+)$.

Example 10 includes the navigation system of any of Examples 1-9, wherein the state propagation algorithm is calculated using an equation equivalent to: $\Delta x_k^- = \phi_k \Delta x_{k-1}^+ - r_k \div T_k$, where $T_k$ is the bias correction provided by the RTAM.

Example 11 includes a method for performing a transfer alignment from a host navigation system to a payload navigation system, the method comprising: receiving a navigation solution from a local strap down navigation processor; receiving a Precision Transfer Alignment Message (PTAM) at a local Kalman filter, the PTAM comprising at least one navigation aid measurement generated by a master Kalman filter; receiving a Reset Transfer Alignment Message (RTAM) at a local Kalman filter, the RTAM comprising a bias correction applied by the master Kalman filter as a navigation reset; propagating a navigation state at the local Kalman filter using the navigation solution from a local strap down navigation processor, wherein the local Kalman filter adds the bias correction to the navigation state; computing a measurement update at the local Kalman filter as a function of the at least one navigation aid measurement and the bias correction, wherein the navigation solution from a local strap down navigation processor is compensated for the bias correction by the measurement update.

Example 12 includes the method of Example 11, wherein the bias correction provided by the RTAM includes one of a position correction, a velocity correction, an attitude correction, or a combination thereof.

Example 13 includes the method of Examples 11 or 12, wherein the bias correction comprises a nine-dimensional vector comprising a 3-dimensional position bias correction, a 3-dimensional velocity correction, and a 3-dimensional attitude correction.

Example 14 includes the method of any of Examples 11-13, wherein the PTAM communicates the at least one navigation aid measurement as absolute navigation solution values; and wherein the RTAM communications the bias correction as a change in navigation solution values.

Example 15 includes the method of any of Examples 11-14, wherein the local strap down navigation processor is coupled to a set of local inertial sensors that comprises at least a triad of orthogonal accelerometers and a triad of orthogonal gyroscopes.

Example 16 includes the method of any of Examples 11-15, wherein the local Kalman filter is implemented using an Extended Kalman Filter algorithm.

Example 17 includes the method of any of Examples 11-16, wherein propagating the navigation state at the local Kalman filter is calculated using an equation equivalent to: $\Delta x_k^- = \phi_k \Delta x_{k-1}^+ - r_k \div T_k$, where $T_k$ is the bias correction provided by the RTAM.

Example 18 includes the method of any of Examples 11-17, wherein computing a measurement update at the local Kalman filter is calculated using an equation equivalent to: $\Delta x_k^+ = \Delta x_k^- + K_k(y_k - H_k \Delta x_k^-)$ where $y_k = PTAM_n - h(x_k^+)$.

Example 19 includes a system comprising: an aircraft having a aircraft navigation system comprising a master Kalman filter; a payload loaded onto the aircraft, the payload having a payload navigation system comprising: a set of local inertial sensors; a local strap-down navigation processor coupled to the set of local inertial sensors, the strap-down navigation processor, the local strap-down navigation processor receiving inertial navigation data from the set of local inertial sensors and converting the inertial navigation data into a navigation solution; a local Kalman filter coupled to the local strap-down navigation processor, the local Kalman filter receiving the navigation solution produced by the local strap-down navigation processor, the local Kalman filter further coupled to the master Kalman filter; wherein the local Kalman filter receives a first message from the master Kalman filter comprising a Precision Transfer Alignment Message (PTAM) that includes at least one navigation aid measurement; wherein the local Kalman filter inputs the navigation aid measurement into a measurement formation algorithm and calculates a measurement residual based on the navigation aid measurement; wherein the local Kalman filter receives a second message from the master Kalman filter comprising a Reset Transfer Alignment Message (RTAM) that includes a bias correction applied by the master Kalman filter as a navigation reset; wherein the local Kalman filter inputs the bias correction into a state propagation algorithm where the bias correction provided by the bias correction is added to a navigation state of the local Kalman filter and propagated.

Example 20 includes the system of Example 19 wherein the measurement formation algorithm is calculated using an equation equivalent to: $y_k = PTAM_n - h(x_k^+)$ and wherein the state propagation algorithm is calculated using an equation equivalent to: $\Delta x_k^- = \phi_k \Delta x_{k-1}^+ - r_k + T_k$, where $T_k$ is the bias correction provided by the RTAM.

Several means of hardware are available to implement the systems and methods of the current invention as discussed in this specification. These means of hardware include, but are not limited to, digital computer systems, microprocessors, general purpose computers, programmable controllers and field programmable gate arrays. Therefore additional embodiments of the present invention include program instructions resident on computer readable storage media which when implemented by such devices, enable them to implement embodiments of the present invention. Computer readable storage media include any form of physical computer data storage hardware, including but not limited to punch cards, magnetic disk or tape, any optical data storage system, flash read only memory (ROM), non-volatile ROM, programmable ROM (PROM), erasable-programmable ROM (E-PROM), random access memory (RAM), or any other form of permanent, semi-permanent, or temporary memory storage system or device. Program instructions and code include, but are not limited to computer-executable instructions executed by computer system processors and hardware description languages such as Very High Speed Integrated Circuit (VHSIC) Hardware Description Language (VHDL).

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. A navigation system for performing a transfer alignment, the navigation system comprising:
    a set of local inertial sensors;
    a local strap-down navigation processor coupled to the set of local inertial sensors, the local strap-down navigation processor receiving inertial navigation data from the set of local inertial sensors and converting the inertial navigation data into a navigation solution;
    a local Kalman filter coupled to the local strap-down navigation processor, the local Kalman filter receiving the navigation solution produced by the local strap-down navigation processor, the local Kalman filter further coupled to a master Kalman filter;
    wherein the local Kalman filter receives a first message from the master Kalman filter comprising a Precision Transfer Alignment Message (PTAM) that includes at least one navigation aid measurement;
    wherein the local Kalman filter inputs the navigation aid measurement into a measurement formation algorithm and calculates a measurement residual based on the navigation aid measurement;
    wherein the local Kalman filter receives a second message from the master Kalman filter comprising a Reset Transfer Alignment Message (RTAM) that includes a bias correction applied by the master Kalman filter as a navigation reset;
    wherein the local Kalman filter inputs the bias correction into a state propagation algorithm where the bias correction provided by the bias correction is added to a navigation state of the local Kalman filter and propagated.

2. The navigation system of claim 1, wherein the bias correction provided by the RTAM includes one of a position correction, a velocity correction, an attitude correction, or a combination thereof.

3. The navigation system of claim 1, wherein the bias correction comprises a nine-dimensional vector comprising a 3-dimensional position bias correction, a 3-dimensional velocity correction, and a 3-dimensional attitude correction.

4. The navigation system of claim 1, wherein the PTAM communicates the at least one navigation aid measurement as absolute navigation solution values; and
    wherein the RTAM communications the bias correction as a change in navigation solution values.

5. The navigation system of claim 1, wherein the set of local inertial sensors comprises at least a triad of orthogonal accelerometers and a triad of orthogonal gyroscopes.

6. The navigation system of claim 1, wherein the local Kalman filter is implemented using an Extended Kalman Filter algorithm.

7. The navigation system of claim 1, further comprising a processing element;
    wherein the local Kalman filter is implemented as an algorithm executed by the processing element.

8. The navigation system of claim 1, wherein the local strap-down navigation processor and the local Kalman filter are both implemented using the same processor.

9. The navigation system of claim 1, wherein the measurement formation algorithm is calculated using an equation equivalent to:

$$y_k = PTAM_n - h(x_k^+).$$

10. The navigation system of claim 1, wherein the state propagation algorithm is calculated using an equation equivalent to:

$$\Delta x_k^- = \phi_k \Delta x_{k-1}^+ - r_k + T_k$$

where $T_k$ is the bias correction provided by the RTAM.

11. A method for performing a transfer alignment from a host navigation system to a payload navigation system, the method comprising:

receiving a navigation solution from a local strap down navigation processor;

receiving a Precision Transfer Alignment Message (PTAM) at a local Kalman filter, the PTAM comprising at least one navigation aid measurement generated by a master Kalman filter;

receiving a Reset Transfer Alignment Message (RTAM) at a local Kalman filter, the RTAM comprising a bias correction applied by the master Kalman filter as a navigation reset;

propagating a navigation state at the local Kalman filter using the navigation solution from a local strap down navigation processor, wherein the local Kalman filter adds the bias correction to the navigation state;

computing a measurement update at the local Kalman filter as a function of the at least one navigation aid measurement and the bias correction, wherein the navigation solution from a local strap down navigation processor is compensated for the bias correction by the measurement update.

12. The method of claim 11, wherein the bias correction provided by the RTAM includes one of a position correction, a velocity correction, an attitude correction, or a combination thereof.

13. The method of claim 11, wherein the bias correction comprises a nine-dimensional vector comprising a 3-dimensional position bias correction, a 3-dimensional velocity correction, and a 3-dimensional attitude correction.

14. The method of claim 11, wherein the PTAM communicates the at least one navigation aid measurement as absolute navigation solution values; and wherein the RTAM communications the bias correction as a change in navigation solution values.

15. The method of claim 11, wherein the local strap down navigation processor is coupled to a set of local inertial sensors that comprises at least a triad of orthogonal accelerometers and a triad of orthogonal gyroscopes.

16. The method of claim 11, wherein the local Kalman filter is implemented using an Extended Kalman Filter algorithm.

17. The method of claim 11, wherein propagating the navigation state at the local Kalman filter is calculated using an equation equivalent to:

$$\Delta x_k^- = \phi_k \Delta x_{k-1}^+ - r_k + T_k$$

where $T_k$ is the bias correction provided by the RTAM.

18. The method of claim 17, wherein computing a measurement update at the local Kalman filter is calculated using an equation equivalent to:

$$\Delta x_k^+ = \Delta x_k^- + K_k(y_k - H_k \Delta x_k^-)$$

where $$y_k = PTAM_n - h(x_k^+).$$

19. A system comprising:

an aircraft having a aircraft navigation system comprising a master Kalman filter;

a payload loaded onto the aircraft, the payload having a payload navigation system comprising:

a set of local inertial sensors;

a local strap-down navigation processor coupled to the set of local inertial sensors, the strap-down navigation processor, the local strap-down navigation processor receiving inertial navigation data from the set of local inertial sensors and converting the inertial navigation data into a navigation solution;

a local Kalman filter coupled to the local strap-down navigation processor, the local Kalman filter receiving the navigation solution produced by the local strap-down navigation processor, the local Kalman filter further coupled to the master Kalman filter;

wherein the local Kalman filter receives a first message from the master Kalman filter comprising a Precision Transfer Alignment Message (PTAM) that includes at least one navigation aid measurement;

wherein the local Kalman filter inputs the navigation aid measurement into a measurement formation algorithm and calculates a measurement residual based on the navigation aid measurement;

wherein the local Kalman filter receives a second message from the master Kalman filter comprising a Reset Transfer Alignment Message (RTAM) that includes a bias correction applied by the master Kalman filter as a navigation reset;

wherein the local Kalman filter inputs the bias correction into a state propagation algorithm where the bias correction provided by the bias correction is added to a navigation state of the local Kalman filter and propagated.

20. The navigation system of claim 1, wherein the measurement formation algorithm is calculated using an equation equivalent to:

$$y_k = PTAM_n - h(x_k^+)$$

and wherein the state propagation algorithm is calculated using an equation equivalent to:

$$\Delta x_k^- = \phi_k \Delta x_{k-1}^+ - r_k + T_k$$

where $T_k$ is the bias correction provided by the RTAM.

* * * * *